(12) United States Patent
Hines

(10) Patent No.: US 10,752,450 B2
(45) Date of Patent: Aug. 25, 2020

(54) PORTABLE INFLATABLE HOVER STRUCTURE

(71) Applicant: Bryan James Hines, Toronto (CA)

(72) Inventor: Bryan James Hines, Toronto (CA)

( * ) Notice: Subject to any disclaimer, the term of this patent is extended or adjusted under 35 U.S.C. 154(b) by 0 days.

(21) Appl. No.: 16/169,924

(22) Filed: Oct. 24, 2018

(65) Prior Publication Data

US 2019/0168973 A1    Jun. 6, 2019

Related U.S. Application Data

(60) Provisional application No. 62/576,531, filed on Oct. 24, 2017.

(51) Int. Cl.
| | | |
|---|---|---|
| *B65G 51/03* | (2006.01) |
| *A47B 13/08* | (2006.01) |
| *A63F 7/36* | (2006.01) |
| *A47B 3/00* | (2006.01) |
| *A47B 37/00* | (2006.01) |
| *A63F 7/06* | (2006.01) |

(52) U.S. Cl.
CPC ............ *B65G 51/03* (2013.01); *A47B 3/00* (2013.01); *A47B 13/08* (2013.01); *A47B 37/00* (2013.01); *A63F 7/3603* (2013.01); *A63F 7/0632* (2013.01)

(58) Field of Classification Search
CPC .......... B65G 51/03; A47B 37/00; A47B 3/00; A47B 13/08; A63F 7/36
See application file for complete search history.

(56) References Cited

U.S. PATENT DOCUMENTS

| 4,462,720 A * | 7/1984 | Lenhart .................. B65G 51/02 |
| | | 406/84 |
| 7,927,045 B2 * | 4/2011 | Kim .................. H01L 21/67784 |
| | | 406/86 |
| 2007/0181735 A1 * | 8/2007 | Fedorov .................. B65G 51/03 |
| | | 242/541.7 |

* cited by examiner

*Primary Examiner* — Jeffrey S Vanderveen
(74) *Attorney, Agent, or Firm* — Cusick IP, PLLC; Clinton J. Cusick, Esq.

(57) ABSTRACT

An inflatable hover structure, conveyor structure, and slide structure are disclosed utilizing an inflatable envelope with a perforated top surface and tensioning reinforcements to establish a smooth hover surface.

13 Claims, 6 Drawing Sheets

PORTABLE INFLATABLE HOVER STRUCTURE

RELATED APPLICATION

This application claims the benefit of U.S. Provisional Application No. 62/576,531 filed on Oct. 24, 2017.

BACKGROUND OF THE INVENTION

Field of the Invention

The present general inventive concept is directed to a portable inflatable structure and a method of making an inflatable structure where objects placed on the structure experience reduced friction from an air cushion. The air cushion can be used to facilitate the movement of objects, and an inflatable structure can provide a play structure where an air cushion causes a play element to hover or provide increased play liveliness. A portable inflatable hover structure can provide a conveyor structure where reduced friction provides ease of travel of various objects. A hover slide structure utilizes an incline and gravity to provide increased velocity.

Description of the Related Art

Air hockey is a popular game where players can play against each other using a low-friction table. Generally, two players stand at the two opposite sides of the air hockey table and use paddles or strikers to move a puck or disc. They try to score by shooting the puck into the opposing player's goal. An air hockey table generally comprises a smooth playing surface that is inflexible, a surrounding rail to prevent the puck and paddles from leaving the table, and goal slots in the rail at either end of the table. A puck return can be located below each goal slot.

Air hockey tables have means to produce air pressure and maintain an elevated pressure on the underside of the playing surface which causes air to pass through apertures in the playing surface. An object on the playing surface is supported by a cushion of air that reduces friction between the object and the playing surface and increases play speed, liveliness, and enjoyment. With sufficient air pressure and velocity through the apertures, an object such as a puck can at least partially hover. The game requires players to be able to reach their half of the playing surface to retrieve a puck or strike a puck. Larger play surfaces that are unreachable to players, including children, provide a challenge for striking or retrieving a puck. Conventional air hockey tables are limited in size based on the arm length of the players.

Air hockey tables are typically have a ventilated surface composed of a wood or plastic and are also limited in size by weight. An air hockey table 8 feet in length can weigh over 250 pounds. Although the increased play liveliness of an air cushion is desirable, physical limitations have resulted in small table sizes with paddles held in the hand while players stand on the ground adjacent the play surface. Conventional air hockey tables are not suitable for scaled up sizes because they are too heavy and are not portable. They must be disassembled prior to transport.

The concept of reduced friction provided by an air cushion has many advantages applicable to both work and play. Moving items at a work site can be facilitated by a low friction surface provided by a portable hover structure. Portable play structures can provide increased enjoyment if large enough to accommodate players on a reduced friction surface. Slides can provide reduced friction and increased velocity with an air cushion. Inflatable play structures are portable, but when inflated they have a tendency to balloon out in the center. While inflated under pressure, inflatables adopt an appearance of an overstuffed item. Inflatables that are bowed out in the center are incompatible with providing a flat hover surface and bias the movement of objects away from the center of the structure. A substantially flat surface is needed to enable objects to hover and travel in a relatively straight line instead of being drawn away from the center of the playing or travel surface. A slide, object conveyor, or hover table that provides straight-line travel is desirable.

What is needed is a large scale portable hover structure that can be employed at desired locations and a method of constructing a portable hover structure. A hover structure that can provide the liveliness of play and is scaled to allow players to play on the surface while providing a substantially flat playing surface can provide the increased engagement of players being positioned inside the game. Applications including object conveyor and slides can benefit from straight-line travel of a smooth hover surface.

SUMMARY OF THE INVENTION

It is an aspect of the present invention to provide an inflatable play structure with an aperture surface that can be scaled up to accommodate a player standing on the play surface. The inflatable play structure is portable and can be moved to different locations.

The above aspects can be obtained by an inflatable hover structure comprising an inflatable envelope that can be made of a laminated drop stitch fabric and sealed with at least one end wall. The inflatable envelope can be tensioned in a lateral direction by one or more lateral tensioners that can be connected to a bottom surface of the inflatable envelope. Tension flaps can be provided on opposite ends of the inflatable envelope and can tension the top surface of the inflatable envelope.

An inflatable support is disclosed with a smoothing membrane to provide a smooth and stable support. Releasable means of attachment can be employed in the alternative or in combination to connect the inflatable envelope to the inflatable support in tensioned connection. It is a further aspect of the invention to provide a portable hover structure that can facilitate the movement of objects over an inclined apertured surface utilizing gravity.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
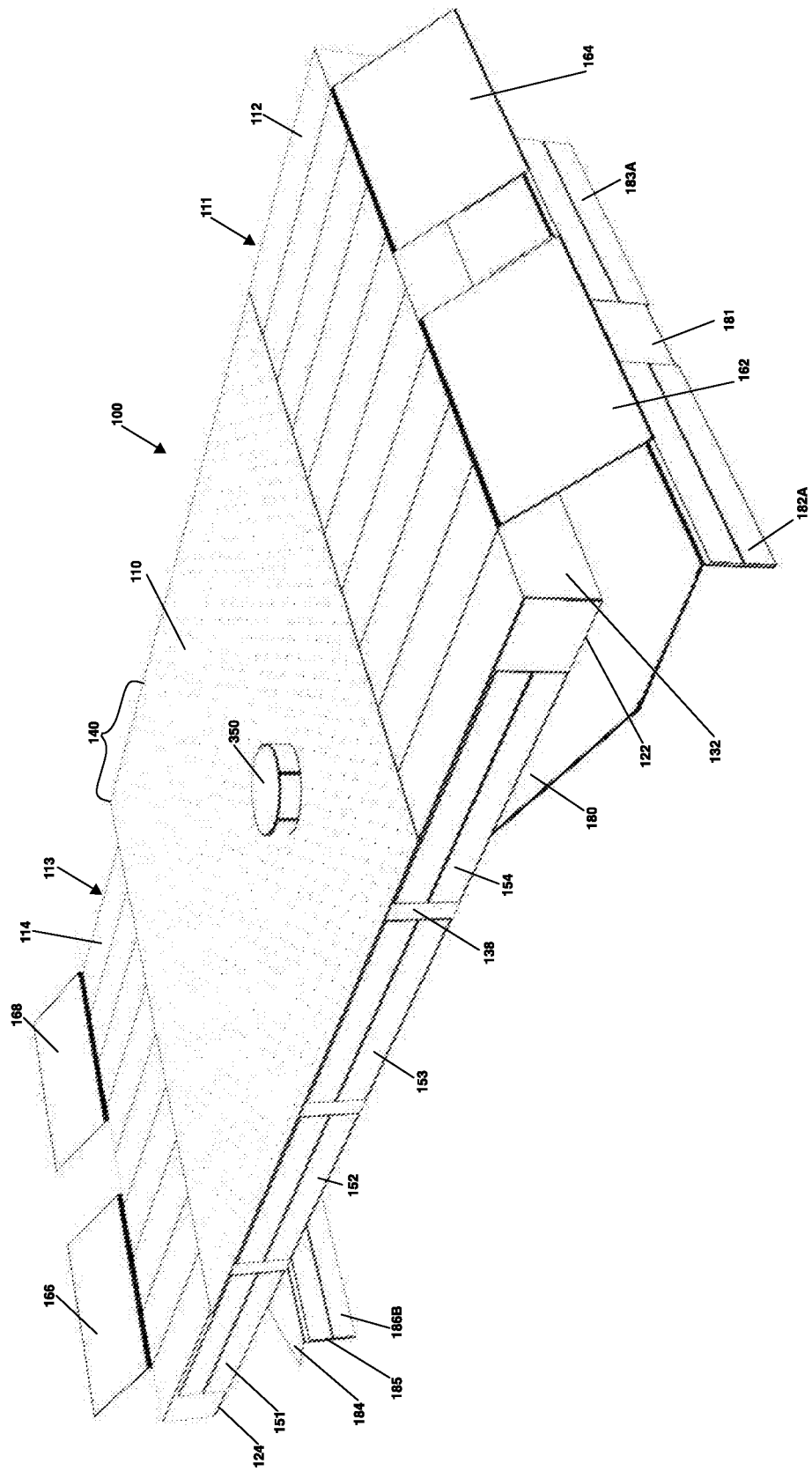
FIG. 1 is a perspective view of an inflatable play surface in an embodiment of the invention.

Reference will now be made in detail to the presently preferred embodiments of the invention, examples of which are illustrated in the accompanying drawings, wherein like reference numerals refer to like elements throughout.

The present inventive concept relates to a hover structure and method of constructing a hover structure with a smooth hover surface to provide unimpeded movement of an object across the hover surface.

FIG. 1 presents a perspective view of an inflatable play surface in an embodiment of the invention. Envelope 100 can comprise a drop stitch fabric that provides a structural rigidity. Drop stitch fabric can incorporate a stich that is dropped during the construction of the fabric. During weaving, a yarn can travel from a first layer to a second layer and be incorporated in the construction of the fabric. The numerous dropped stitches connect the envelope top surface 110 and the envelope bottom surface 120. When inflated, the plurality of yarns 190 restrain the distance between top surface 110 and bottom surface 120. The use of a dual layer drop stitch fabric provides added stability and helps maintain envelope top surface 110 equidistant from envelope bottom surface 120 determined by the length of yarns 190. Envelope top surface 110 and envelope bottom surface 120 can be woven drop stitch material laminated with PVC to prevent air leakage. Envelope 100 can be provided in any shape including a rectangle, circle, square, oval, star, etc. For simplicity of explanation, an embodiment comprising a rectangular playing surface is shown, but the present inventive concept is applicable to various shapes. Bumpers or rails can be added to a rectangular playing surface 110 to provide an oval shape available for play that emulates an ice hockey rink. Plurality of apertures 140 can be created by utilizing a laser cutter to form an aperture of desired size and distance from adjacent apertures. For example, apertures 1/16 inch in diameter can be spaced apart in a 1/2 inch grid pattern. The size of the apertures in combination with the distance of the adjacent apertures will provide a set amount of aperture area open to flow for a given area of envelope top surface 110. Apertures can be sized from 1/64 inch to 1/8 inch or more in diameter and can be spaced from about 1/2 inch to one inch or two inches or more apart. The air flow through apertures 140 will depend on the air pressure in inflatable envelope 100 and size and spacing of the apertures. Air flow can be increased by increasing the size of apertures or decreasing the spacing between the apertures during manufacture of envelope top surface 110. In use, air flow can be modified by adjusting the delivery of an air pump or blower to provide more of less air pressure. Apertures can be formed by utilizing a sewing machine to pierce envelope top surface 110 in a consistent pattern. Apertures can also be formed with a drill or set of drill bits spaced apart and repeatedly applied to create a plurality of apertures 140 in envelope top surface 110. In an embodiment formed by puncturing or drilling a drop stitch fabric that creates holes in envelope bottom surface 120, the bottom surface can be resealed, for example by lamination with PVC adhesive.

In a particular embodiment, players can stand on the inflatable envelope 100 and various structures such as bumpers, walls, and goals can be employed on the surface of inflatable envelope 100. In order to maintain air pressure and rigidity, an embodiment of the invention provides baffled extensions 111 and 113 on opposite sides of apertured envelope top surface 110. Baffled extensions 111 and 113 can be constructed of PVC tarpaulin and connected to the drop stitch fabric of envelope top surface 110 and envelope bottom surface 120 to create an inflatable construct capable of holding elevated air pressure and being inflated. First baffled extension 111 can comprise first baffled top surface 112 and first baffled bottom surface 122. Second baffled extension 113 can comprise second baffled top surface 114 and second baffled bottom surface 124. An envelope side wall 138 can be attached and sealed to form a durable structure. In a circular or oval embodiment, a single envelope side wall can extend around the entire inflatable envelope 100. In a square or rectangular embodiment side wall 138 can combine with side wall 136 and end wall 132 and end wall 134 to form a three dimensional structure and sealing the top and bottom surfaces of each of the drop stitch fabric and baffled extensions. Envelope top surface 110 provides the active air cushion for providing lively movement to an object. Since pressure loss causes decreased rigidity, the baffled extensions can be airtight to provide rigid support for bumpers, guides, goals, or other play elements that are not intended for lively movement.

A play element such as a hover disc 350 can be provided with a concave or recessed underside to decrease weight and accentuate the effect of the air cushion. Embodiments of the play structure can emulate a soccer pitch that uses a hover disc with the appearance of a soccer ball. A hover disc resembling a bowling ball can be pushed across the play surface to strike bowling pins. Curling can be emulated with a hover disc configured like a curling stone or rock. The bumpers and surrounding play elements can be themed to resemble the appropriate stadium or structure for different sports. Bumpers can be interchanged to present a different size or shape of available play surface.

Inflatables can become more rigid under pressure. An inflatable structure that is perforated as shown with envelope top surface 110 presents a particular challenge in establishing a stable play surface because air pressure is constantly being lost through apertures 140. In order to provide consistent play mechanics, envelope top surface 110 must also be smooth and flat. An object will travel in a straight line after struck by a player unless there is an irregularity in the play surface. The present invention provides a number of structural aspects to maintain a stable play surface as well as a level surface for consistent play action. A joining fabric such as hook and loop fabric can be attached to side walls, for example side wall 138. A number of adhesive means can be employed including gluing or sewing. However hook and loop fabric is commonly available and is easy to adhere and to remove where adjustments are needed. It is known that hook and loop joining means can be reversed in position between two elements. Herein, adhering means can refer to the hook side and receiving means can refer to the loop side, and the adhering means and receiving means can be interchanged as to position and provide the same function. Joining fabric can comprise snaps, zippers, hook and loop, or other cooperating structures that can be used to removably attach elements and provide stability. The side walls 136 and 138 and end walls 132 and 134 serve to seal the sides of the play surface and can be PVC tarpaulin or selected from other suitable materials. The side walls and end wall can be connected to the top surface and bottom surface by stitching or other connecting means including heat welding or gluing.

First tension flap 162 can be sewn to the seam between envelope end wall 132 and first baffle top surface 112, and in other shapes and configurations, can be attached to envelope top surface 110 or otherwise attached to upper envelope 100. Tension flap 162 can be outfitted with adhering means and can be utilized to provide tension to top surface 110 through first baffle top surface 112. Similarly second tension flap 164, third tension flap 166, and fourth tension flap 168 can be attached to envelope 100 and each can comprise adhering means. Flap adhering means 167 is disposed on the underside of fourth tension flap 168 and flap adhering means 169 is shown on the underside of third tension flap 166. It is preferable that at least one tension flap be positioned opposite a second tension flap to tension top surface 110 by pulling in opposite directions. Receiving means can be incorporated in side wall 132 and side wall 136, for example first envelope adhesive section 151 can comprise a loop portion of a hook and loop fastener and can be sewn into side wall 132. A continuous strip of receiving means can be attached across the entire side wall or disparate sections can be utilized including second adhesive section 152, third adhesive section 153, and fourth adhesive section 154.

Inflation means known in the art such as an air pump or blower can be utilized to inflate envelope 100 through manifold tube 172 and manifold connection 170. Manifold inlet 174 can provide access to the interior of inflatable envelope 100 and located for convenient access, for example in upper end wall 134.

Figure 2:
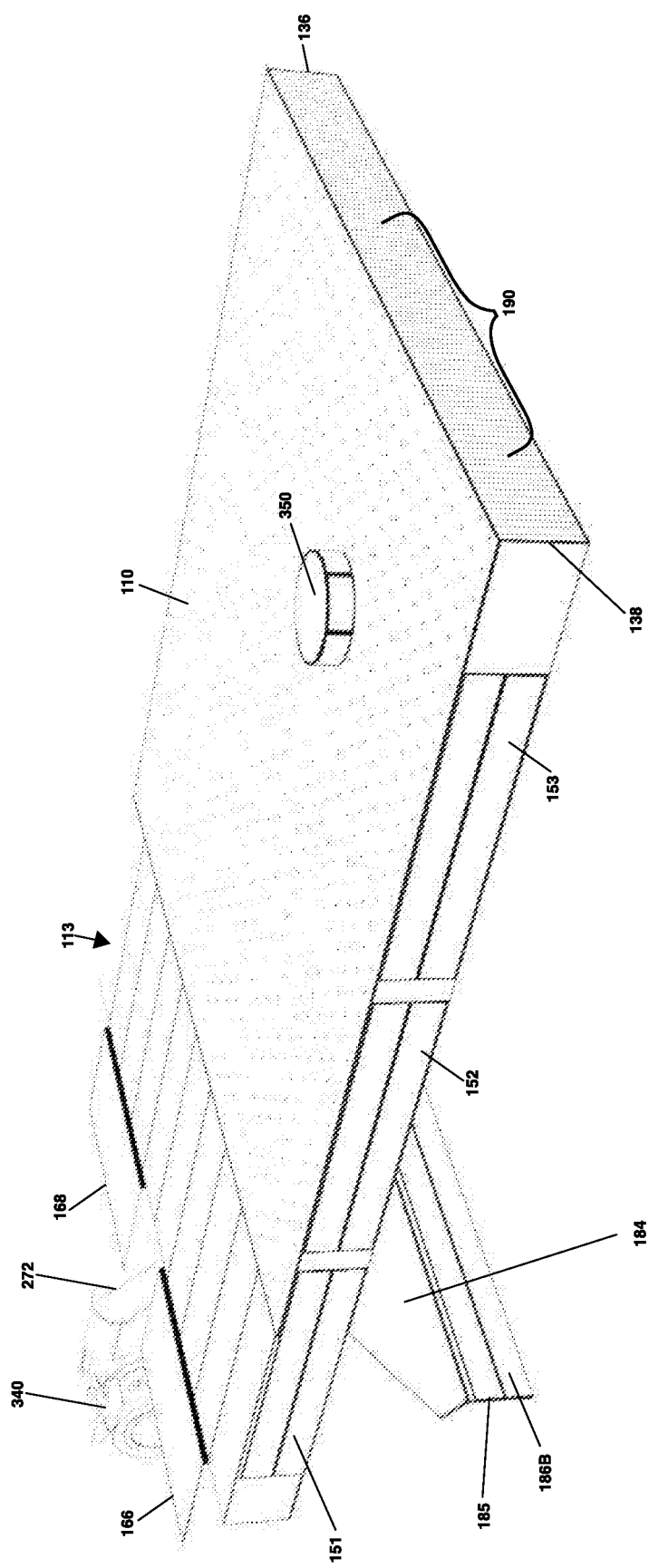
FIG. 2 is a sectional view of an inflatable play surface in an embodiment of the invention comprising drop stitch fabric

FIG. 2 presents a cross section view of envelope 100. Yarns 190 are shown connecting envelope top surface 110 and envelope bottom surface 120 and each yarn represents a drop stitch. In a typical drop stitch fabric, the number of yarns 190 is extensive, and so a representative number of yarns 190 is shown in the Figure. A typical embodiment with a top surface 110 measuring over 100 square feet can comprise thousands of yarns 190.

Figure 3:
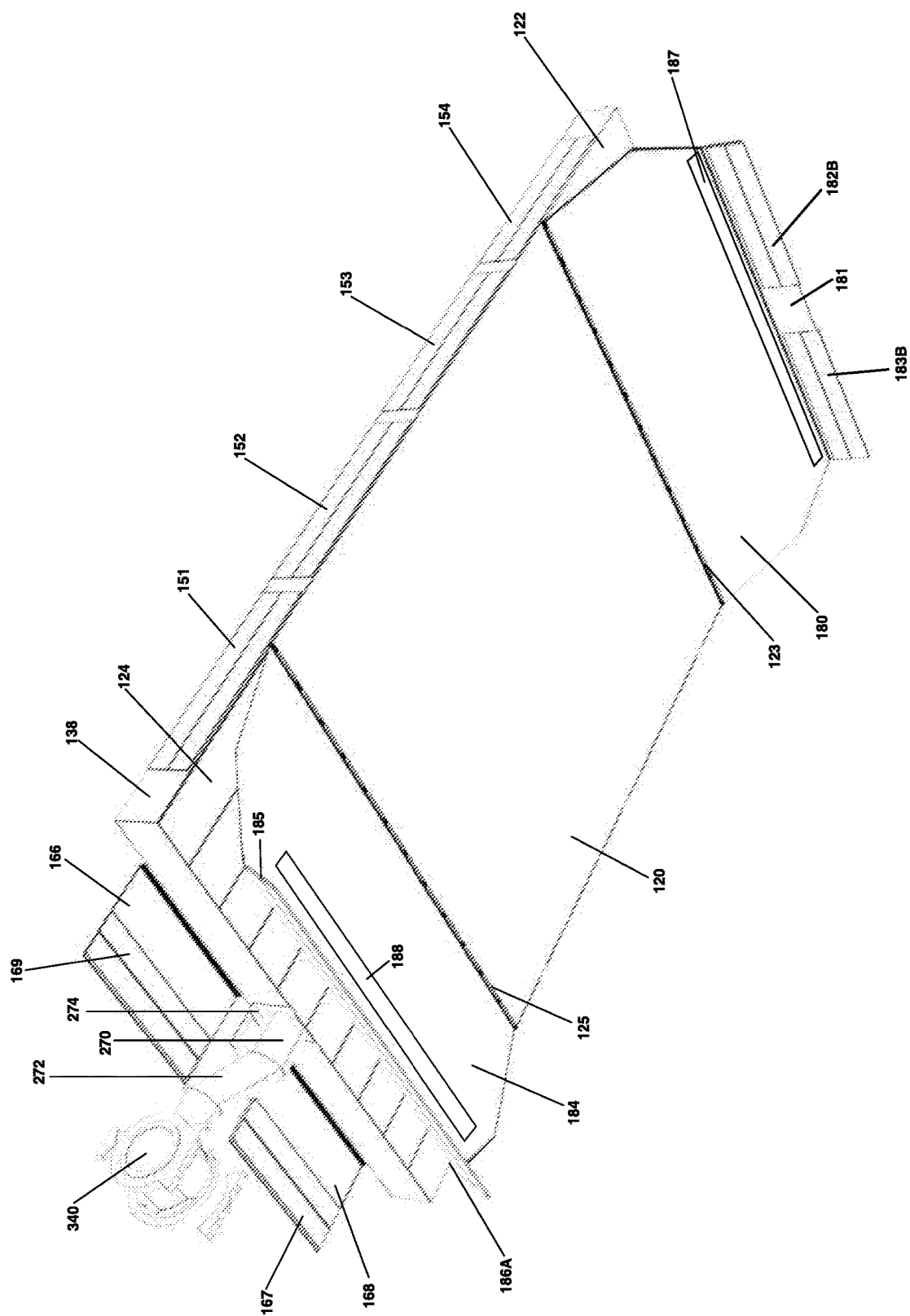
FIG. 3 is a perspective view of an inflatable play surface in an embodiment of the invention.

FIG. 3 presents a perspective view of inflatable envelope 100 showing envelope bottom surface 120 as well as first baffle bottom surface 122 and second baffle bottom surface 124. The apertured drop stitch portion of the inflatable envelop can be sealed with the same structure as the baffled extensions, for example envelope side wall 138. It will be understood that other play structure shapes can be provided with additional baffle extensions and different combinations of shapes such as a star or X shape.

Figure 4:
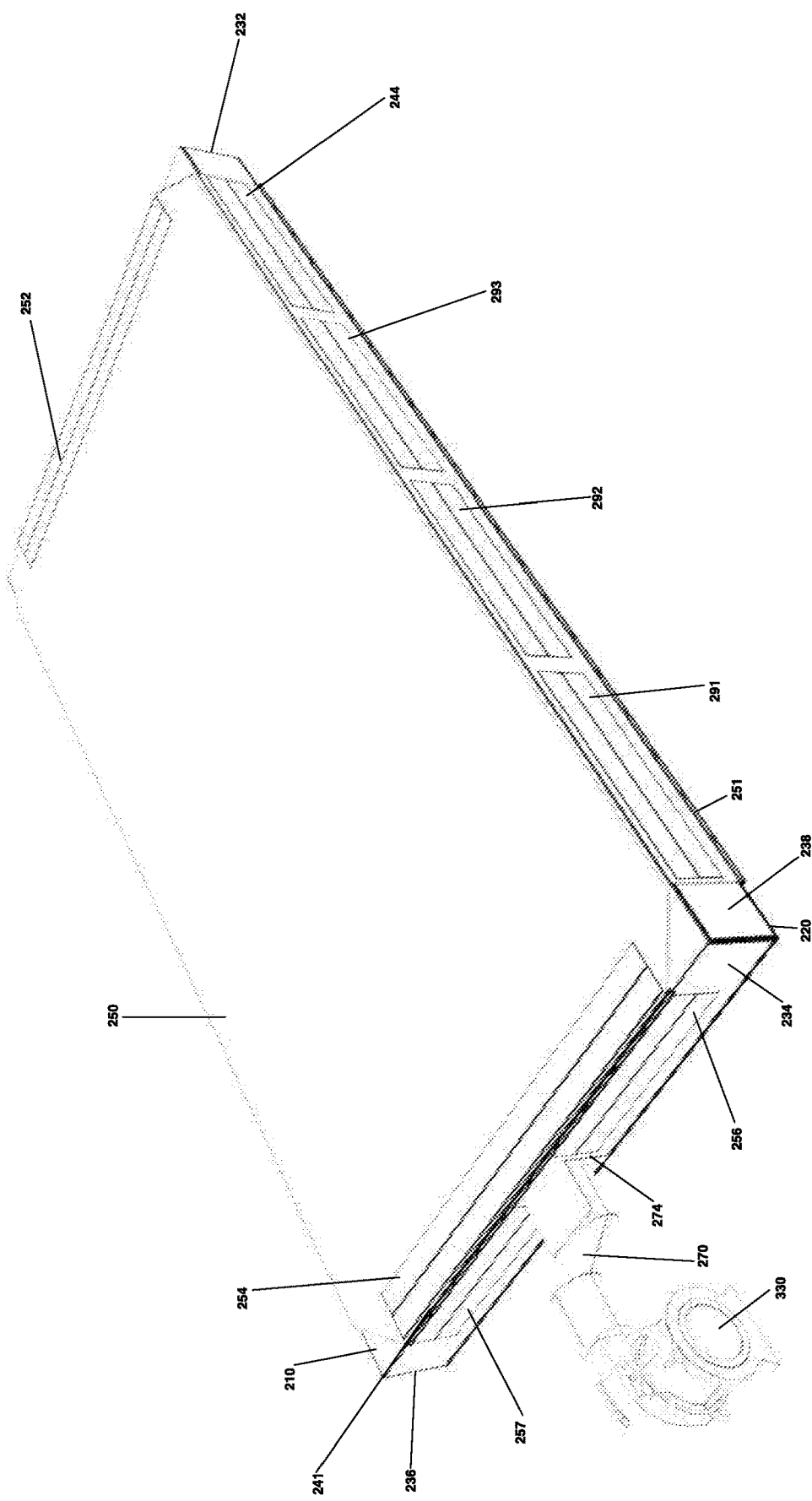
FIG. 4 is a perspective view of an inflatable support in an embodiment of the invention.

FIG. 4 presents a perspective view of inflatable support 200. Inflatable support 200 is configured for joining with inflatable envelope 100 and providing additional support and stability to the device of the invention. Inflatable support 200 can be circular or square or rectangular or other shape correlated to the shape of inflatable envelope 100. A rectangular embodiment is shown. Side wall 236 and side wall 238 combine with end wall 234 and end wall 232 to join support top surface 210 to support bottom surface 220 and create a closed structure. Where support top surface 210 is round or oval shaped, a single side wall can connect a top surface and a bottom surface. Manifold inlet 274 receives manifold connection 270 connected to manifold tube 272 for attachment to inflation means such as blower, 330. Lower envelope 200 can be constructed with baffles that create a wave shaped support top surface 210 that appears scalloped in cross section. These baffles are common in inflatables, but do not present a flat or even surface. In order to provide a more rigid and consistent supporting structure, smoothing membrane 250 can be attached to inflatable support 200. Smoothing membrane 250 can be tensioned across support top surface 210 to span the baffled construction and provide a level, rigid surface. Support end wall 234 can be configured with joining fabric or adhesive receiving means in vertical adhesive receiver 256 to facilitate stable attachment of inflatable envelope 100 to inflatable support 200. Vertical adhesive receiver 256 can extend along the length of end wall 234 and can be configured to receive both first tensioning flap 162 and second tensioning flap 164. Support end wall 234 can also be configured with second vertical adhesive receiver 257. Similarly, adhesive receiving means can be attached to smoothing membrane 250 in lateral adhesive receiver 254 and lateral adhesive receiver 252. Joining fabric comprising receiving means can be attached to support side wall 238 in a continuous strip or in separate sections shown here as first support adhesive section 291, second support adhesive section 292, third support adhesive section 293, and fourth support adhesive section 294. These support adhesive sections can also be attached to smoothing membrane 250.

Dual layer mesh smoothing membrane 250 can be formed from a fabric. In an embodiment a fabric with a thickness of 2 to 3 mils can be used. In another embodiment two fabric sheets can be sewn together to form a dual layer smoothing membrane 250. In another embodiment, industrial closed weave mesh fabric can be utilized and joined together to form a smoothing membrane 250 comprising a dual layer mesh fabric.

Smoothing membrane 250 can be joined to the inflatable support by connecting a first side to an exterior seam, wrapping smoothing membrane 250 around the support top surface 210 and connecting a second side to a second exterior seam opposite the first exterior seam, for example, attachment at membrane stitching 251 near the seam between support side wall 238 and support bottom surface 220. Attachment proximate support side wall 236 can be similarly configured. To provide additional tension and rigidity, smoothing membrane 250 can also be sewn to inflatable support 200 adjacent support side wall 234 and support side wall 232, for example at membrane top stitching 241. The shape of smoothing membrane 250 can be calculated to provide tension when inflatable support 200 is inflated, and can be sewn together prior to inflation. When inflated, the air pressure of inflatable support 200 provides the force to pull smoothing membrane 250 taut across support top surface 210.

Figure 5:
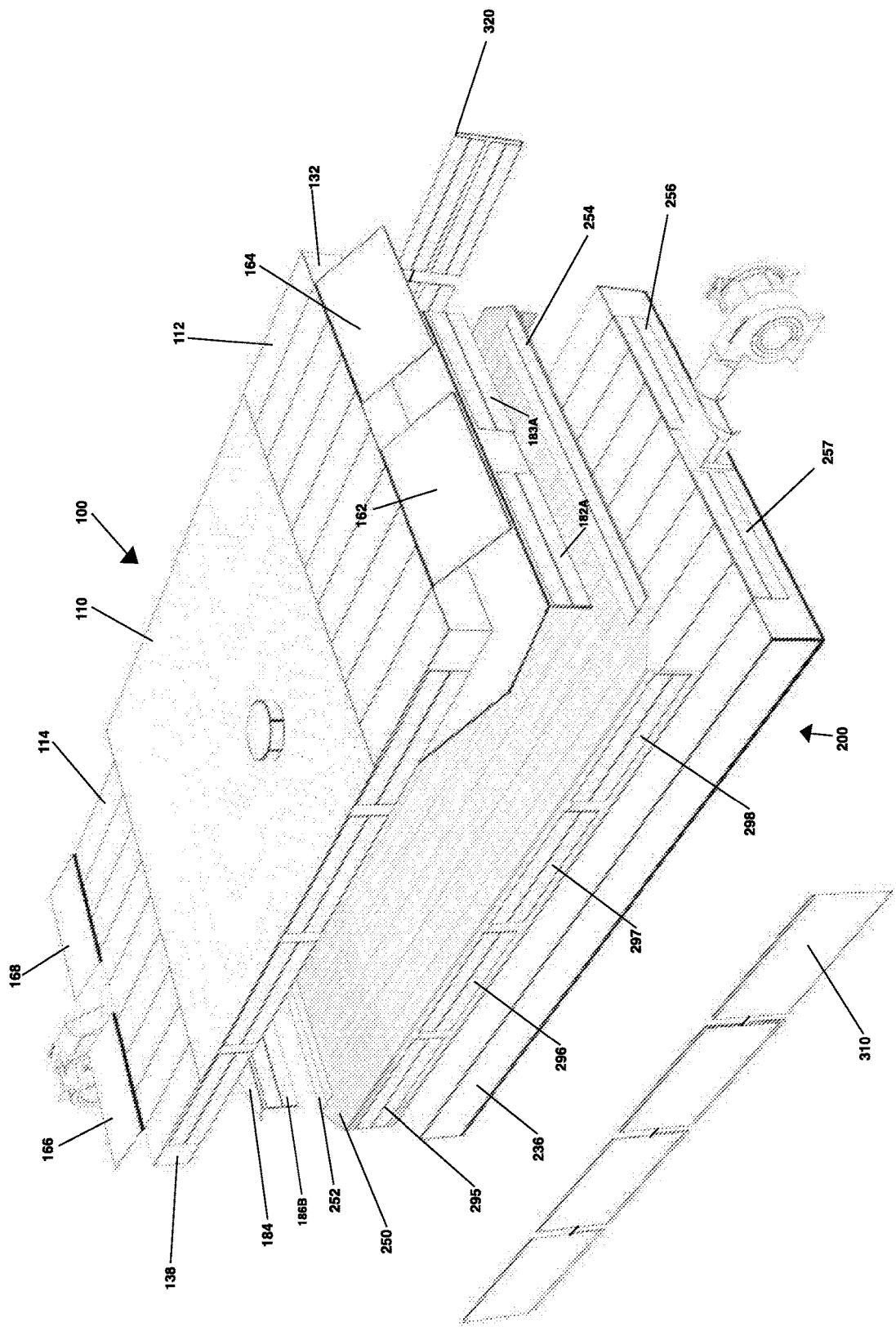
FIG. 5 is an exploded view of a hover play structure in an embodiment of the invention.

FIG. 5 presents an exploded view of a hover play structure in an embodiment of the invention. A pressurized envelope of fabric has a tendency to expand to approximate a sphere. Bulging in the center of the inflatable envelope 100 creates an uneven envelope top surface 110 and objects placed on the surface will slide away from the center. The present invention provides reinforcements to maintain a flat and level play surface in upper top surface 110. It is a particular challenge of the construction of the play structure to reinforce an inflatable envelope that leaks air and cannot be fully pressurized to become rigid. Further, it is an aim of the current invention to provide a soft play surface so that players, for example children, can fall on the play surface and avoid injury that would occur on a wooden floor or an ice surface. Ice hockey requires players to wear extensive padding whereas the present invention provides a play surface that is flat and consistent while still being cushioned.

Inflatable envelope 100 provides a play surface in envelope top surface 110 that is perforated. Inflatable envelope 100 is inflated via inflation means 340 that can comprise an electric pump or blower. Inflatable support 200 provides support in the form of an inflatable underfloor. Inflatable support 200 can comprise a baffled inflatable construction. Materials such as PVC tarpaulin are suitable for baffled construction. Tensioning means are shown to connect inflatable envelope 100 to inflatable support 200 in a tensioned connection. First lateral tensioner 180 can be formed from a fabric material that is connected to envelope bottom surface 120, for example by sewing. Second lateral tensioner 184 also connected to envelope bottom surface 120 and is shown in the opposite direction. Joining fabric can be employed such as receiving means in first exterior adhesive 182A and first interior adhesive 182B. Second lateral tensioner 184 can also comprise tensioning fabric in second tensioner tab 185. On the underside of e.g. first lateral tensioner 180, joining fabric can be attached such as adhering means in first tensioner adhesive section 187 for adhering to, for example, lateral adhesive receiver 252. Joining fabric or receiving means can be attached to lower side wall 236 in the form of fifth support adhesive section 295. Alternately, two or more discrete adhesive panels can be located across support side wall 236 including sixth support adhesive section 296, seventh support adhesive section 297, or eighth support adhesive section 298. Support side wall 238 can be configured in like manner with continuous panels of joining fabric or discrete panels in support adhesive sections 291 through 294.

The side walls of the inflatable envelope 100 and inflatable support 200 can be joined under tension with reinforcements, for example joining strap 310 and joining strap 320. Joining strap 310 can comprise joining fabric, for example adhering means to span across first support adhesive section 295 and first envelope adhesive section 151 to provide connection of inflatable envelope 100 and inflatable support 200. Joining strap 310 can be connected to inflatable envelope 100 before inflation, during inflation, or after inflatable support 200 is inflated and before inflatable envelope 100 is inflated to achieve tensioning during inflation. Joining strap 320 can be similarly configured on the other side of the device to provide similar benefit. Joining strap 310 can comprise connected panels or a set of discrete panels for responsive adjustment as needed when the terrain or placement surface is uneven or other balancing of tension is desired.

Figure 6:
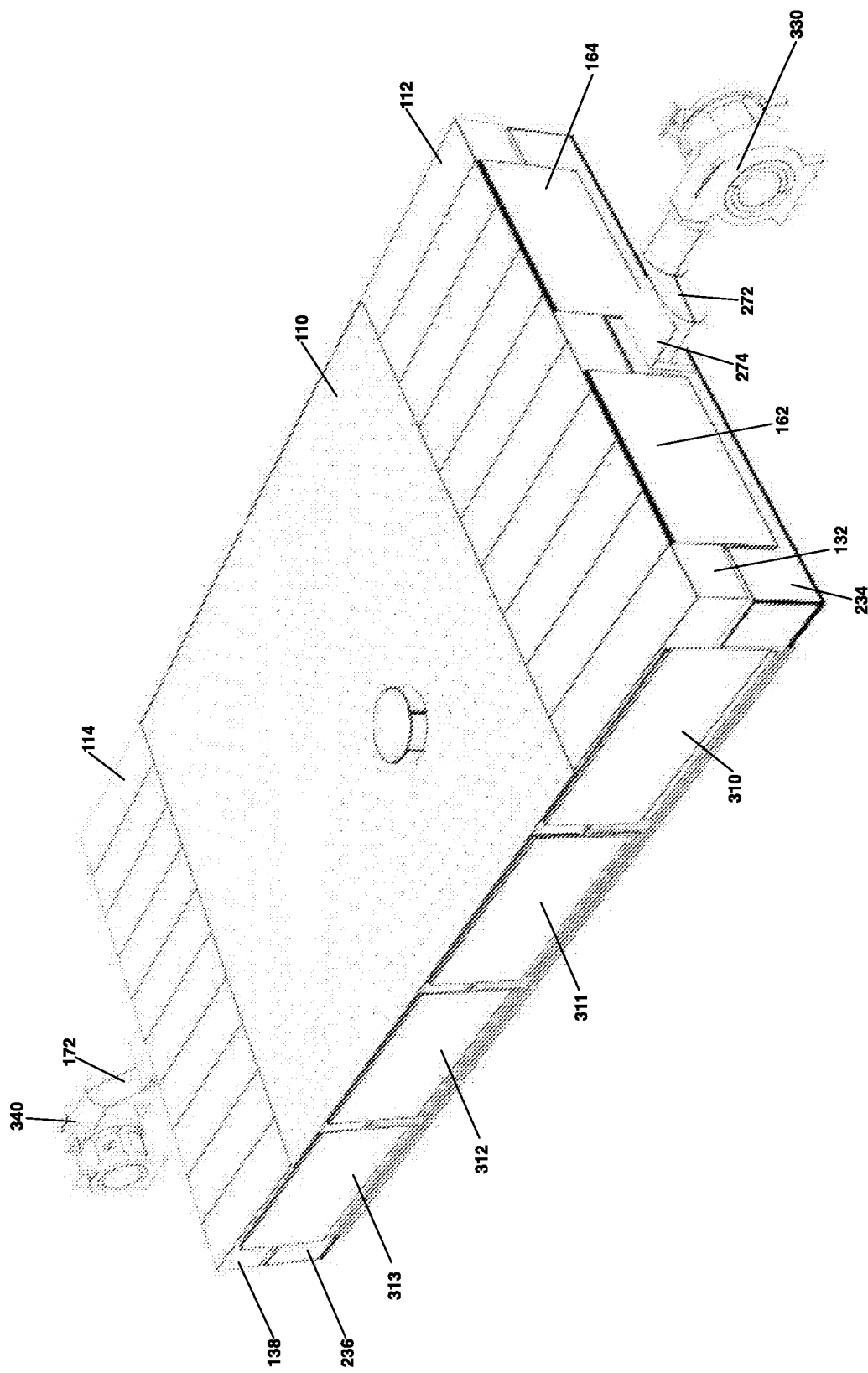
FIG. 6 is a perspective view of a hover play structure in an embodiment of the invention.

FIG. 6 presents a perspective view of a hover play structure in an embodiment of the invention. Joining strap 310 is shown with second joining strap 311, third joining strap 312 and fourth joining strap 313. First tension flap 162 is attached to the joining means first exterior adhesive 182A and first interior adhesive in turn is attached to vertical adhesive receiver 257. Second tension flap 164 is attached to the joining means third exterior adhesive 183A. Third tension flap 166 and fourth tension flap 168 are attached in similar manner on the opposite side of the play structure to tension the top of the structure and provide a flat, smooth playing surface in envelope top surface 110.

The present invention is directed at providing a reinforced flat surface for continuous travel. When horizontal, actions of the players cause the object to move and the effects of gravity are avoided. The players provide the impetus for movement of an object across the surface of the hover structure when the surface is true. Gravity can be beneficially employed to cause or bias movement in a particular direction.

The inventive concept of a hover structure can also be employed to move objects and provide increased utility. In a conveyor embodiment, a ramp with a slight angle can provide automated movement in a desired direction. The inflatable envelope top surface 110 can be provided on a slight incline, and a destination can be placed at the end of the top surface 110 in lieu of a goal. By way of example, a play structure can provide a hover play surface in an embodiment that is ten feet by ten feet and provides one hundred square feet of play area. By changing the configuration of the top surface 110 to only two feet wide for the movement of objects, the same surface area and apertures can be configured to provide a conveyor structure that is two feet wide and fifty feet long. Additional distances can be provided with different configurations and multiple hover structures can be placed in a sequence to convey objects over longer distances. Conveyor hover structures can be moved, inflated, and removed as needed in various locations.

The inventive concept of a hover structure can be employed in a recreational slide. A significant incline can be utilized in connection with a hover surface to provide significant velocity. Gravity can be employed to provide the impetus for travel on a reduced friction surface. Typical inflatable slides are bowed out in the middle from air pressure. A smooth surface provides increased consistency of forward travel and is safer to operate at higher velocity. Velocity at the end of the slide can be reduced where the air cushion of the hover structure is absent. A suitable mat or vehicle can be utilized by a rider to take advantage of the air cushion of the hover surface. A slide that is approximately horizontal can be utilized where a rider generates their own velocity. A dry slide with an air cushion is more convenient than an inflatable slide that relies on water to reduce friction. Water requires special attire and is not compatible with all locations, especially indoors or where drainage is challenging.

A preferred method of construction includes providing a dual sided drop stitch fabric of a desired size and shape. Apertures are formed by piercing, drilling, or laser cutting in repetition to form a grid in the top surface 110. The top surface can be joined to a bottom surface with end walls and side walls as needed to correspond to the shape of the top surface 110. Optionally, in larger embodiments a first or second baffled extension can be formed and connected to top surface 110 and bottom surface 120. Side walls and end walls can be added to form a three dimensional closed structure. At least one tension flap 162 can be sewn to a wall, for example envelope end wall 132. Additional tension flaps can be connected, for example third tension flap 166 to opposite end wall 134. Connection can be made by sewing the tension flap to an exterior seam between, for example envelope end wall 132 and first baffle top surface 112. Lateral tensioners can be added by sewing a portion of fabric to the seam between envelope bottom surface 120 and first baffle bottom surface 122, for example at first tensioner seam 123. First tensioner tab 181 can be configured with joining fabric at first exterior adhesive 182A and on a second surface at first interior adhesive 182B. Second tensioner tab 185 can comprise joining fabric in second exterior adhesive 186A and second interior adhesive 186B. Additionally, first tensioner flap can also comprise a separate section of joining fabric such as third exterior adhesive 183A and third interior adhesive 183B. First lateral tensioner 180 can also be configured with a first tensioner adhesive section configured to interface with, for example lateral adhesive receiver 254. Second lateral tensioner 184 can be configured with joining means such as second tensioner adhesive section 188 configured for releasable connection with, for example, lateral adhesive receiver 252. Similarly, second lateral tensioner 184 can be sewn to the seam between envelope bottom surface 120 and second baffle bottom surface 124, at second tensioner seam 125.

Inflatable support 200 can be constructed with baffled material as is known in the art. Inflatable support 200 can be reinforced to provide a support for inflatable envelope 100. A smoothing membrane can be tensioned across support top surface 210, for example by sewing a fabric to an attachment point on each side of support envelope 200. For example, an external seam between support side wall 238 and support bottom surface 220 can serve as an attachment point. In FIG. 4, smoothing membrane 250 is shown attached on one side of inflatable support 200 with membrane stitching 251. Smoothing membrane can be single ply, dual ply, and can be PVC tarpaulin, canvas, closed mesh nylon, or other suitable materials. Joining fabric can be added to smoothing membrane 250, for example by gluing or sewing, to provide first support adhesive section 291, which can be continuous across the support end wall 238 or combined with other support adhesive sections. Joining fabric can also be attached to smoothing membrane 250 to provide lateral adhesive receiver 252 and lateral adhesive receiver 254. Vertical adhesive receiver 256 can comprise joining fabric, including receiving means, and can extend across support end wall 234, or can be provided in a section and joined by vertical adhesive receiver 257. Support side wall 236 can be configured the same way as support side wall 238, and support end wall 232 can be configured the same way as support end wall 234. Other tension means can be employed in addition to joining fabric including ratchets, cam buckles, cam straps, bungie cord, or bungie tape.

The operations described herein can be performed in any sensible order. Any operations not required for proper operation can be optional.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An inflatable hover structure comprising
an inflatable envelope comprising a perforated top surface and a continuous bottom surface;
an inflatable support comprising a support top surface and a support bottom surface;
a first lateral tensioner connected from said inflatable envelope to said inflatable support;
a second lateral tensioner connected from said inflatable envelope to said inflatable support;
said first lateral tensioner extends from said continuous bottom surface to a first side of said inflatable support;
said second lateral tensioner extends from said continuous bottom surface to a second side of said inflatable support;
said first lateral tensioner extends in a direction generally opposite to said second lateral tensioner;
a first tension flap connected from a first side of said perforated top surface to said first side of said inflatable support; and
a second tension flap connected from a second side of said perforated top surface to said second side of said inflatable support.

2. The structure of claim 1 further comprising a smoothing membrane disposed on said support top surface.

3. The structure of claim 2 wherein:
said first lateral tensioner is fixedly attached to said inflatable envelope and is removably attached to a first adhesive receiver disposed on said inflatable support;
said second lateral tensioner is fixedly attached to said inflatable envelope and is removably attached to a second adhesive receiver disposed on said inflatable support.

4. The structure of claim 3 wherein:
said first tension flap is fixedly attached to said inflatable envelope and is removably attached to a first exterior adhesive disposed on said first lateral tensioner;
said second tension flap is fixedly attached to said inflatable envelope and is removably attached to a second exterior adhesive disposed on said second lateral tensioner.

5. The structure of claim 4 further comprising a smoothing membrane fixedly attached with a first membrane stitching to a first wall of said inflatable support and is fixedly attached with a second membrane stitching to a second wall of said inflatable support.

6. The structure of claim 1 further comprising:
a first baffle extension connected to said inflatable envelope;
a second baffle extension connected to said inflatable envelope; and
at least one side wall sealing said perforated top surface, a first baffle top surface, and a second baffle top surface to said continuous bottom surface, a first baffle bottom surface, and a second baffle bottom surface to form an inflatable construct.

7. The structure of claim 6 wherein said first baffle bottom surface is connected to said continuous bottom surface at a first tensioner seam and said first lateral tensioner is fixedly attached to said first tensioner seam, and said second baffle bottom surface is connected to said continuous bottom surface at a second tensioner seam and said second lateral tensioner is fixedly attached to said second tensioner seam.

8. The structure of claim 6 wherein said first tension flap is connected to said first baffle extension and said second tension flap is connected to said second baffle extension.

9. The structure of claim 8 wherein a smoothing membrane is fixedly connected to a first support end wall, a second support end wall, a first support side wall, and a second support side wall.

10. The structure of claim 9 wherein said smoothing membrane comprises:
a first lateral adhesive receiver configured for releasable attachment to a first tensioner adhesive section disposed on said first lateral tensioner;
a second lateral adhesive receiver configured for releasable attachment to a second tensioner adhesive section disposed on said second lateral tensioner.

11. The structure of claim 9 further comprising:
a first support adhesive section disposed on said first support side wall;
a second support adhesive section disposed on said second support side wall;
a first envelope adhesive section disposed on a said at least one side wall;
a second envelope adhesive section disposed on a second envelope side wall;

a first joining strap configured for releasable attachment to said first support adhesive section and said first envelope adhesive section to connect said first support side wall to said at least one side wall; and a second joining strap configured for releasable attachment to said second support adhesive section and said second envelope adhesive section to connect said second support side wall to said second envelope side wall.

12. The structure of claim 10 wherein:

said first support end wall comprises a first vertical adhesive receiver configured for releasable attachment to a first interior adhesive disposed on a first tensioner tab;

and said second support end wall comprises a second vertical adhesive receiver configured for releasable attachment to a second interior adhesive disposed on a second tensioner tab.

13. The structure of claim 12 wherein:

said first tensioner tab comprises a first exterior adhesive configured for releasable attachment to said first tension flap;

said second tensioner tab comprises a second exterior adhesive configured for releasable attachment to said second tension flap.

* * * * *